Figure 1:
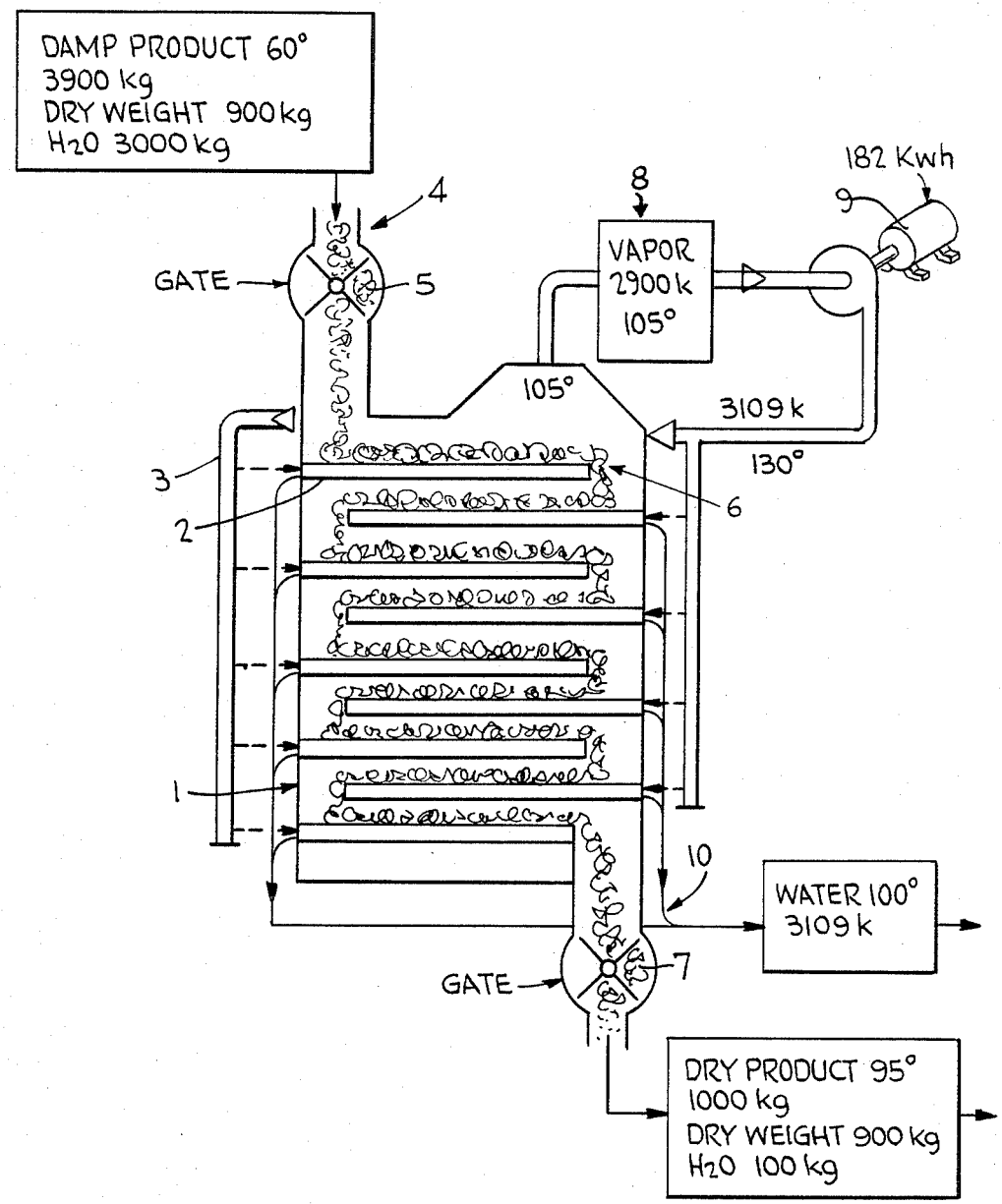

United States Patent [19]

Cuel

[11] Patent Number: 4,523,388
[45] Date of Patent: Jun. 18, 1985

[54] METHOD FOR DRYING BY VAPOR RECOMPRESSION

[75] Inventor: Jacques Cuel, Paris, France

[73] Assignee: Beghin-Say S.A., Paris, France

[21] Appl. No.: 480,950

[22] PCT Filed: Jul. 16, 1982

[86] PCT No.: PCT/FR82/00119
§ 371 Date: Mar. 28, 1983
§ 102(e) Date: Mar. 28, 1983

[87] PCT Pub. No.: WO83/00547
PCT Pub. Date: Feb. 17, 1983

[30] Foreign Application Priority Data

Jul. 28, 1981 [FR] France ................................ 81 14670

[51] Int. Cl.³ .............................................. F26B 3/20
[52] U.S. Cl. .......................................... 34/35; 34/86; 34/169
[58] Field of Search ............... 34/22, 36, 73, 75, 86, 34/168, 169, 171, 177, 178, 35, 40

[56] References Cited

U.S. PATENT DOCUMENTS

| 205,662 | 7/1878 | McDowell et al. | 34/237 |
| 1,540,769 | 6/1925 | Ericson | 34/173 |
| 3,953,927 | 5/1976 | Hoffert | 34/9 |
| 4,068,388 | 1/1978 | Knutsen et al. | 34/36 |
| 4,223,452 | 9/1980 | Chambers | 34/169 |
| 4,337,584 | 7/1982 | Johnson | 34/169 |

FOREIGN PATENT DOCUMENTS 292542 2/1930 United Kingdom .
709131 5/1954 United Kingdom .

Primary Examiner—Larry I. Schwartz
Assistant Examiner—David W. Westphal
Attorney, Agent, or Firm—A. W. Breiner

[57] ABSTRACT

Method for drying damp material by vapor recompression. The vapor (8) released by the damp material (4) circulating on the heating elements (2) of a vertical dryer is recompressed by means of a motor-compressor (9) so as to provide the heat-conveying fluid to the heating elements (2) of the dryer. Application to the drying of damp vegetables.

7 Claims, 4 Drawing Figures

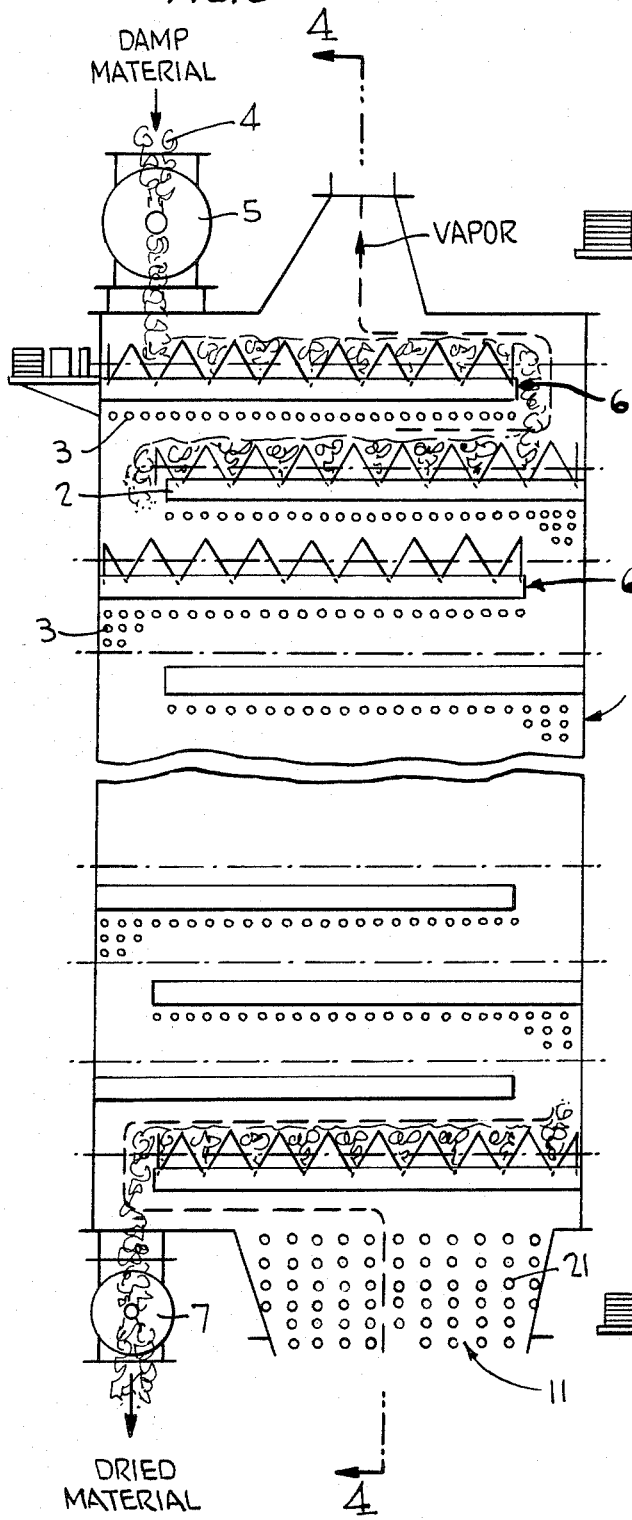
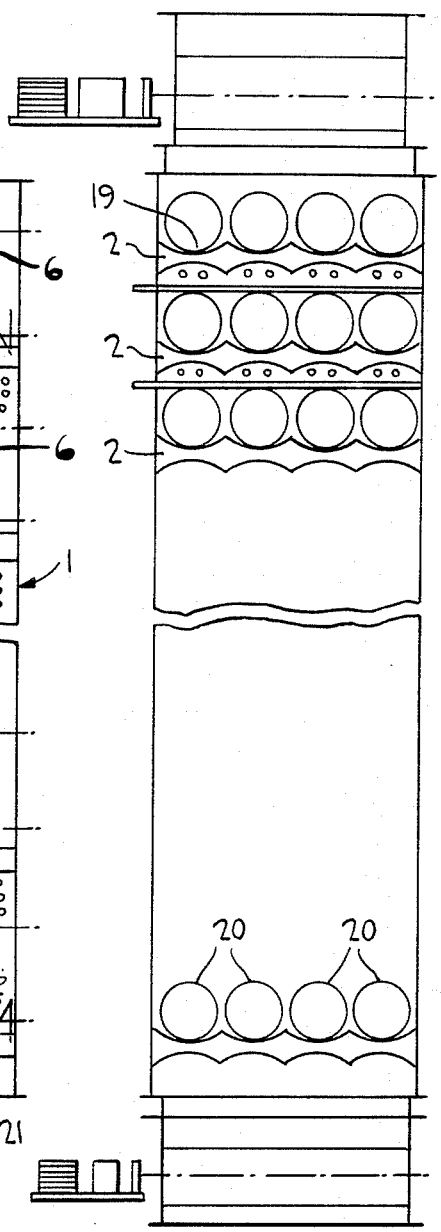
FIG. 3
FIG. 4

METHOD FOR DRYING BY VAPOR RECOMPRESSION

The present invention concerns a process and equipment for drying damp materials, in particular vegetables.

"Combustion-chamber" dryers are already known; their energy consumption varies between 600 Kcal and 750 Kcal/kg of evaporated water depending on the equipment used. Moreover, such dryers entail a more than trivial consumption of fuel.

The object of the present invention is a so-called "low-temperature" drying process. This process essentially consists in bringing the damp material into contact with the dryer's heater elements, the vapor issuing from the damp material being mechanically recompressed to provide the caloric fluid that feeds the dryer's heater elements.

In a variation of the invention, the temperatures are so selected that the caloric fluid consists of a given quantity of air operating between two temperatures; the air is saturated at the low temperature and unsaturated at the high temperature. The calories required for evaporation are provided within the dryer both by the contact between the solid and the heater surface, and by the contact between the moist air and heater surface.

The moist, hot air leaving the dryer is cooled prior to recompression in the tube-stack of an evaporator of which the cold fluid is condensed water in the heater elements and condensed water in the evaporator itself.

It was found particularly desirable that the evaporator calandria be balanced on a barometric condenser and provide to the intake side of the motor-compressor the vapor which, following recompression, will feed the dryer's heater elements.

Advantageously, the temperature of the damp material at the dryer intake will be between 50° C. and 100° C., and preferably it shall be about 60° C.

In case the dryer lacks an air feed, the temperature of the vapor feeding the dryer's heater elements will be advantageously between 100° C. and 160° C., and preferably it shall be 105° C.;

the temperature of the vapor issuing from the damp material will be between 80° C. and 110° C., and preferably it shall be 95° C.;

the temperature of the condensates from the heater elements will be between 70° C. and 100° C., and preferably it shall be about 100° C.

In case the dryer is fed at its lower part with saturated air, the temperature of the vapor feeding the dryer's heater elements will be between 100° C. and 160° C., and preferably it shall be about 110° C.;

the temperature of the vapor/air mixture issuing from the moist vapor will be between 80° C. and 110° C., and preferably it shall be about 75° C.;

the temperature of the condensates from the heater elements will be between 70° C. and 100° C., and preferably it shall be 75° C.;

the temperature of the saturated air injected into the lower dryer part will be between 60° C. and 100° C., and preferably it shall be about 70° C.

The attached drawings and the following examples are non-limiting, and permit a better understanding of the invention:

Sheet I showing FIG. 1 illustrates the basic drying principle of the invention.

Figure 2:
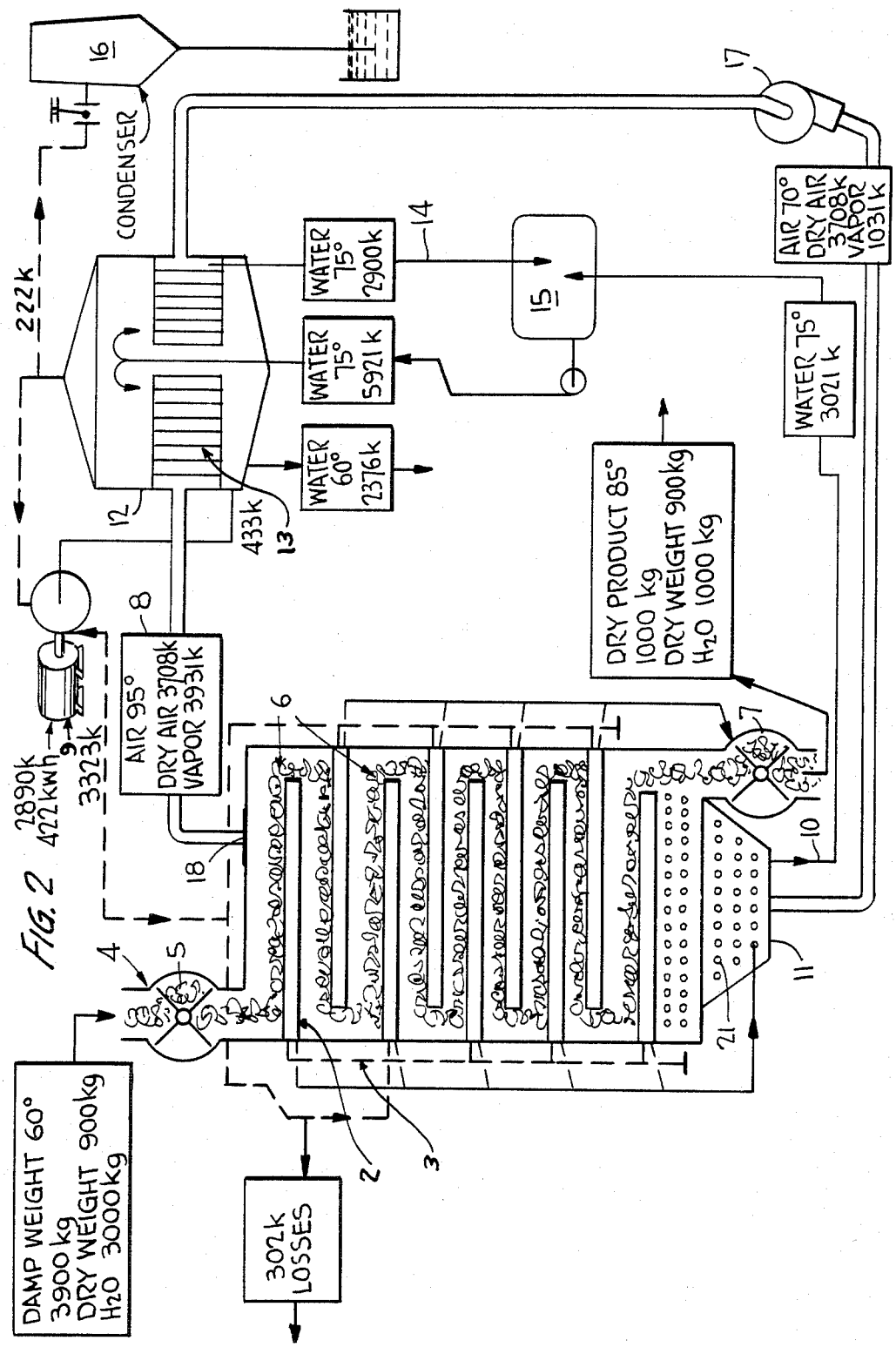

Sheet II showing FIG. 2 illustrates a variation of the drying process of the invention.

Sheet III showing FIGS. 3 and 4 illustrates drying equipment for the implementation of the process. At sheet III, FIG. 3 is a sectional view and FIG. 4 is a view taken alone line 4—4 of FIG. 3.

The sheet I schematically shows a dryer (1) provided with heater elements (2) fed with the vapor (3). The damp material (4) is introduced at the upper part of the dryer through a gate (5). A suitable system propels as needed the damp material onto the heater elements. Once the material arrives at the end (6) of an element, it drops by gravity onto the element directly below. The bottom of the dryer comprises a gate (7) for evacuating the dry material. The vapor (8) issuing from the heated damp material is recompressed by a motor-compressor (9), and thereupon it feeds the dryer heater elements (2).

EXAMPLE 1

3,900 kg of damp vegetables (4) with a specific heat of 0.29 and containing 23% of dry material, at a temperature of 60° C., are introduced at (5). The heater elements (2) are fed with vapor at 130° C. 2,900 kg of vapor (8) at 105° C. are collected at the top of the dryer. The single-stage motor-compressor (9) has a power input of 182 kwh (76% efficiency) and recompresses the vapor from 105° C. to 130° C. After eliminating the overheating, 3,109 kg of vapor are collected and used to feed the heater elements (2). 3,109 kg of water at 100° C. are recovered at (10) at the heater-elements exhaust, and 100 kg of 90% dry material at a temperature of 95° C. are collected at the lower dryer end. Neglecting the radiation losses, the dryer uses 0.062 kwh for each kg of evaporated water. The figure must be compared with the energy use of the combustion chamber dryers, 600 to 750 Kcal/kg of evaporated water.

Nevertheless, it was found that the dryer described in Example 1 suffers from several drawbacks:

the exchange coefficient between a solid and a heater surface is low;

it is rather difficult to directly obtain a recompressible vapor because certain sealing defects make possible air re-entry, and the damp material contains air or included or occluded gases;

condensation takes place in the cold part of the equipment.

A variation of the invention allows solving the above-cited problems. Sheet II illustrates this variation which is described in the example below.

EXAMPLE 2

3,900 kg of damp vegetables (4) with a specific heat of 0.29 and containing 23% of dry material, at a temperature of 60° C., are introduced at (5). The heater elements (2) are heated by vapor to 110° C. Saturated air heated to 70° C. by being passed over the tubes (21) wherein circulates water condensed from the recompressed vapor by means of a blower (17) is introduced at (11) in the base of the dryer. The saturated air consists of 3,708 kg of dry air and 1,031 kg of vapor. A mixture consisting of 3,708 kg of air and 3,931 kg of vapor at a temperature of 95° C. is recovered at (8) at the top of the reactor.

This mixture is guided toward a vacuum-evaporator (12). The mixture is brought back to saturation at 70° C. in the stack (13) by an exchange with a cold fluid consisting of water at 60° C.—this temperature being regulated by the condenser (16)—whereby 60° C. vapor is obtained. The source of the cold fluid is 3,021 kg of water at 75° C. (10) from the return flow of the heater elements and the return water of the evaporator which are recycled on the cold fluid side. 2,900 kg at 75° C. (14) are collected at the stack exhaust and directed to a tank (15); in this manner 5,921 kg at 75° C. are obtained. 3,112 kg of vapor are recovered at the evaporator exhaust; 222 kg are moved toward a condenser (16), and 2,890 kg toward a motor-compressor (9). The vapor is recompressed at 110° C.

It is estimated that the operation of the dryer required 3,323 kg of vapor at 110° C., whereas theoretically 3,021 kg should suffice (condensates recovered at (10)); accordingly, there is a loss of 302 kg, that is about 10%.

The motor-compressor absorbed 422 kwh; therefore, the dryer consumption is 0.146 kwh/kg of evaporated water (2,900 kg were evaporated).

At (7), 1,000 kg of material with 90% dryness at 85° C. are recovered.

The drying process of the invention permits "low-temperature" operation. As regards the variation discussed in Example 2, it suffers from no drawback regarding the inclusion of stray air because the drying takes place in the air-vapor medium; the calories contained in the air are recycled in the dryer at the exhaust of the evaporator stack. Furthermore, the air takes part in the calories' transfer and improves drying.

Even though the above examples describe a drying process taking place at atmospheric pressure, it is obvious that the damp material can be dried at higher pressure.

Sheet III shows a dryer for implementing the above-described drying process. It consists of a vertical cylindrical casing (1) wherein are arranged horizontal heating plates (2) which are mutually staggered so as to allow the damp material (4) entering the dryer through the gate (5) to circulate by gravity from one plate to the next. The plates are complemented by tubes (3) within which circulates the vapor. The drying material is moved on the plates by advance screws (20) of which the axes are parallel.

The screws operate without play, and the surface (19) of the plates (2) is fluted. The dry material is evacuated through the gate (7). The dryer is provided at its lower part with an opening (11) admitting air preheated by being passed on tubes (21) within which circulates the condensed water of the recompressed vapor; the upper part of the dryer comprises an opening (18) to evacuate the air/vapor mixture of the material to be dried.

I claim:

1. A drying process for drying a damp material in a closed vertical dryer having upper and lower ends and having a plurality of horizontally and vertically spaced heating plates positioned therein comprising the steps of feeding a damp material into the upper end of said closed vertical dryer, causing said damp material to pass continuously over and in contact with one surface of said heating plates in order that said damp material proceeds through said dryer to an exit point at the lower end of said vertical dryer, simultaneously feeding into the said lower end of said vertical dryer a mixture of dry air and water vapor under conditions which will provide saturated feed air at a temperature between 60° C. and 100° C.; removing from the upper end of said vertical dryer a mixture of dry air and water vapor at a temperature above the temperature of said saturated feed air; cooling said removed mixture to the temperature of said saturated feed air to provide saturated air and water vapor separately, compressing said vapor to raise the temperature thereof to be above the temperature of said saturated air, and refeeding said saturated air to the bottom of said vertical dryer and said heated vapor to said heating plates to heat said plates.

2. Drying process according to claim 1 wherein said mixture is cooled by passing it through an evaporator within which circulates a cold fluid.

3. Drying process according to claim 2 wherein the evaporator is a vacuum evaporator.

4. Drying process according to claim 1 wherein the temperature of the damp material at the dryer intake is between 50° C. and 100° C.

5. Drying process according to claim 4 wherein the temperature of the damp material at the dryer intake is about 60° C.

6. Drying process according to claim 1 wherein the temperature of the vapor or the vapor mixed with air issuing from the damp material is between 80° C. and 110° C.

7. Drying process according to claim 1 wherein the temperature of the saturated feed air injected into the lower part of the dryer is about 70° C.

* * * * *